US012636927B2

(12) United States Patent
Bouaru et al.

(10) Patent No.: US 12,636,927 B2
(45) Date of Patent: May 26, 2026

(54) TORQUE CONTROL IN AN ACTIVE ROLL CONTROL SYSTEM

(71) Applicant: JAGUAR LAND ROVER LIMITED, Warwickshire (GB)

(72) Inventors: Adrian Bouaru, Whitley (GB); Thomas Papanikolaou, Whitley (GB); Jonathan Melling, Whitley (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 56 days.

(21) Appl. No.: 18/702,482

(22) PCT Filed: Oct. 18, 2021

(86) PCT No.: PCT/EP2021/078792
§ 371 (c)(1),
(2) Date: Apr. 18, 2024

(87) PCT Pub. No.: WO2023/066443
PCT Pub. Date: Apr. 27, 2023

(65) Prior Publication Data
US 2025/0262905 A1      Aug. 21, 2025

(51) Int. Cl.
*B60G 17/0165* (2006.01)
*B60G 17/015* (2006.01)
*B60G 21/055* (2006.01)

(52) U.S. Cl.
CPC ..... *B60G 17/0165* (2013.01); *B60G 17/0157* (2013.01); *B60G 21/0555* (2013.01);
(Continued)

(58) Field of Classification Search
CPC ............ B60G 17/0165; B60G 17/0157; B60G 17/018; B60G 2202/42; B60G 2400/821; B60G 2800/9122; B06G 21/0555
See application file for complete search history.

(56) References Cited

U.S. PATENT DOCUMENTS 5,161,816 A * 11/1992 Okuda ............... B60G 17/0165
280/5.515
2002/0133277 A1 * 9/2002 Koh ........................ F16F 9/535
701/37
(Continued)

FOREIGN PATENT DOCUMENTS

DE       102008005247       6/2009
DE       102013205370       10/2014
(Continued)

OTHER PUBLICATIONS

International Search Report and Written Opinion for International Application No. PCT/EP2021/078792 mailed Jun. 3, 2022.

*Primary Examiner* — George C Jin
(74) *Attorney, Agent, or Firm* — Carlson, Gaskey & Olds, P.C.

(57) ABSTRACT

Aspects relate to a control system and method for a vehicle suspension system in a vehicle (900). The control system (100, 200) is configured to: receive a torque request signal (165) indicative of a requested torque value to be applied to an actuator (272, 282) of a roll control system; determine whether the requested torque value is within a predetermined range of torque demand values, wherein the predetermined range covers a zero torque demand value; and if the requested torque is within the predetermined range of torque demand values, output a signal to control the roll control system in dependence on a control function; wherein the control function is configured to: apply and maintain a positive predetermined level of torque to the actuator when the requested torque value is positive; and apply and maintain a negative predetermined level of torque to the actuator when the requested torque value is negative.

17 Claims, 8 Drawing Sheets

(52) U.S. Cl.
CPC .... *B60G 2202/42* (2013.01); *B60G 2400/821*
(2013.01); *B60G 2800/9122* (2013.01)

(56)  References Cited

U.S. PATENT DOCUMENTS

2014/0297116 A1* 10/2014 Anderson ............ B60G 17/019
                                            701/37
2022/0009303 A1* 1/2022 Beddis ............... B60G 17/0165

FOREIGN PATENT DOCUMENTS

WO      WO-2010122418 A1 * 10/2010 ......... B60G 21/0555
WO          2018219561     12/2018

\* cited by examiner

200

CONTROLLER 400 → 402 → CONTROL SYSTEM → 404 → CONTROL SYSTEM 406

DETERMINE TORQUE REQUEST BETWEEN +/-    ⌐502

TORQUE REQUEST ADJUSTMENT    ⌐504

UNADJUSTED TORQUE DEMAND SIGNAL    ⌐506

900

TORQUE CONTROL IN AN ACTIVE ROLL CONTROL SYSTEM

TECHNICAL FIELD

The present disclosure relates to a Noise Vibration Harshness (NVH) management method for geared actuators. Aspects of the invention relate to a control system, a system, a vehicle, a method, and computer readable instructions, for NVH management of active roll control actuators.

BACKGROUND

Vehicles (for example, petrol, diesel, electric, hybrid) comprise active suspension systems, such as electronic active roll control (electronic active roll control) systems, for maintaining vehicle stability. Such electronic active roll control systems comprise at least one actuator, the actuator being coupled to an anti-roll bar and configured to actively impart motor control on the suspension system. To provide the motor control to the actuators of the electronic active roll control system, the electronic active roll control system may be supplied by a dedicated power supply system, such a 48V supply. Faults arising from an electronic active roll control system, such as unintended actuation (and, consequently, imparted motor control), can lead to undesired path deviation by the vehicle. The electronic active roll control system therefore has a high functional safety integrity requirement (for example, a high Automotive Safety Integrity Level (ASIL)). Throughout this disclosure, the term "anti-roll bar" is used and is synonymous with the terms "roll bar", "anti-sway bar", "sway bar" or "stabilizer bar".

When external torques are applied to such active suspension systems (from road inputs, for example) a change of sign across the actuator can be caused (for example, a positive torque may move to a negative torque), which in turn causes a change of rotational direction of the gearbox. This can cause rotational lash within the gearbox. When this rotational lash is released and the gearbox is quickly re-engaged, an impulsive force may radiate through the suspension system and into the structure of the vehicle. The measured impulse caused by the rotational lash is dependent on the rate-of-change of torque across the gearbox; thus, the larger the rate-of-change of torque, the larger the measured impulse.

Multiple rotational lash events in quick succession may be perceived in the vehicle cabin as a harsh rattle; individual rotational lash events may be perceived as discrete knock events. This issue is more severe at low speeds where masking environmental noise is significantly lower than at higher speeds. This may lead to problems with the longevity of the mechanical components of the suspension system, and may create a perception of the quality of the vehicle suspension systems being poor.

It is an aim of the present invention to address one or more of the disadvantages associated with the prior art.

SUMMARY OF THE INVENTION

Aspects and embodiments of the invention provide a control system, a system, a vehicle, a method, and computer readable instructions, for mitigating NVH phenomena by controlling the torque profile to be achieved by a roll control system, as claimed in the appended claims.

According to an aspect of this disclosure there is provided a control system for a vehicle suspension system in a vehicle, the control system comprising one or more controllers, the control system configured to: receive a torque request signal indicative of a requested torque value (for example, a vehicle requested torque value) to be applied to an actuator of a roll control system; determine whether the requested torque value is within a predetermined range of torque demand values, wherein the predetermined range covers a zero torque demand value; and if the requested torque is within the predetermined range of torque demand values, output a signal to control the roll control system in dependence on a control function; wherein the control function is configured to: apply and maintain a positive predetermined level of torque to the actuator when the requested torque value is positive; and apply and maintain a negative predetermined level of torque to the actuator when the requested torque value is negative.

In this way improved NVH characteristics may be achieved, for example by reducing the number of torque zero crossings taking place.

The control function may be configured to: determine that the requested torque value changes between positive and negative torque values; apply a torque request adjustment to the torque request signal to obtain an adjusted torque demand signal to be provided to the actuator, wherein the torque request adjustment comprises application of a ramp rate to the torque request signal to control the rate of change of torque applied to the actuator; and provide the adjusted torque demand signal to the actuator.

The control function may be configured to apply the torque request adjustment to the torque request signal prior to providing the adjusted torque demand signal to the actuator if the requested torque value is in the predetermined range.

The control function may be configured to provide an unadjusted torque demand signal indicative of the requested torque value to the actuator if the requested torque value is outside the predetermined range, wherein the unadjusted torque demand signal is configured to cause the actuator to apply the requested torque value.

The control function may be configured to provide a damping control signal to a damping system, the damping control signal configured to cause the damping system to apply a predetermined level of damping to a damping actuator of the vehicle. The control function may be configured to, when a level of damping higher than the predetermined level of damping is applied, apply and maintain the higher level of damping to the damping actuator for a predetermined period of time.

The control function may be configured to monitor the requested torque to determine whether the requested torque remains within the predetermined range of torque demand values.

The control function may be configured to be activated in dependence on one or more of a speed of the vehicle and a road roughness index corresponding to a driving surface on which the vehicle is located. The control system may be configured to determine to deactivate the control function based on the speed of the vehicle and the road roughness index, and deactivate the control function in dependence on the determination by providing a first actuation control signal to the actuator to adjust a current torque demand corresponding to a current torque demand signal in agreement with the torque request signal within a predetermined time period. The predetermined time period may be dependent on whether, when it is determined to deactivate the control function, the requested torque value is within the predetermined range of torque demand values.

The rate of change of the torque may be calibratable.

In another aspect there is provided a system, comprising: the control system for a vehicle suspension system of a vehicle according to any preceding claim; an actuator of a roll control system; and an adaptive damping system.

In another aspect there is provided a vehicle comprising any control system disclosed herein or any system disclosed herein.

An another aspect there is provided a method, comprising: receiving a torque request signal indicative of a requested torque value to be applied to actuator of a roll control system; and determining whether the requested torque is within a predetermined range of torque demand values, wherein the predetermined range covers a zero torque demand; when the requested torque is within the predetermined range of torque demand values, outputting a signal to control one or more systems of the vehicle suspension system to manage suspension of the vehicle in dependence on a control function; wherein the control function is configured to: apply and maintain a positive predetermined level of torque to the actuator when the requested torque value is a positive value; and apply and maintain a negative predetermined level of torque to the actuator when the requested torque value is a negative value.

In another aspect there is provided computer readable instructions which, when executed by a processor of any control system disclosed herein, are arranged to perform any method disclosed herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Active suspension systems, such as electronic active roll control utilizing mechatronic systems, may include a cascade of systems, such as:

(a) a high level vehicle control layer, which may generate system demand signals (for example torque demands) to influence vehicle motion;

(b) a low level control layer, which may provide control signals to actuators (for example motor control) to deliver the demanded signal from the high level control; and (c) a physical actuation layer, comprising motors and associated mechanical components to deliver the physical manifestation of the demanded signal.

When external torques are applied to such active suspension systems (from road inputs, for example) a change of sign across the actuator from positive to negative, or vice versa, takes place, which in turn causes a change of rotational direction of the gearbox. This can cause rotational lash within the gearbox. When this rotational lash is released and the gearbox is quickly re-engaged, an impulsive force may radiate through the suspension system and into the structure of the vehicle. The measured impulse caused by the rotational lash is dependent on the rate-of-change of torque across the gearbox; thus, the larger the rate-of-change of torque, the larger the measured impulse.

Multiple rotational lash events in quick succession may be perceived in the vehicle cabin as a harsh rattle; individual rotational lash events may be perceived as discrete knock events. This issue is more severe at low speeds where masking environmental noise is significantly lower than at higher speeds. This is an undesirable effect and may be detrimental to the perceived quality of the vehicle as well as the longevity of the mechanical components of the suspension system.

Examples disclosed herein may provide for reduction of such events to improve noise, vibration and harshness (NVH) in the vehicle.

Figure 1:
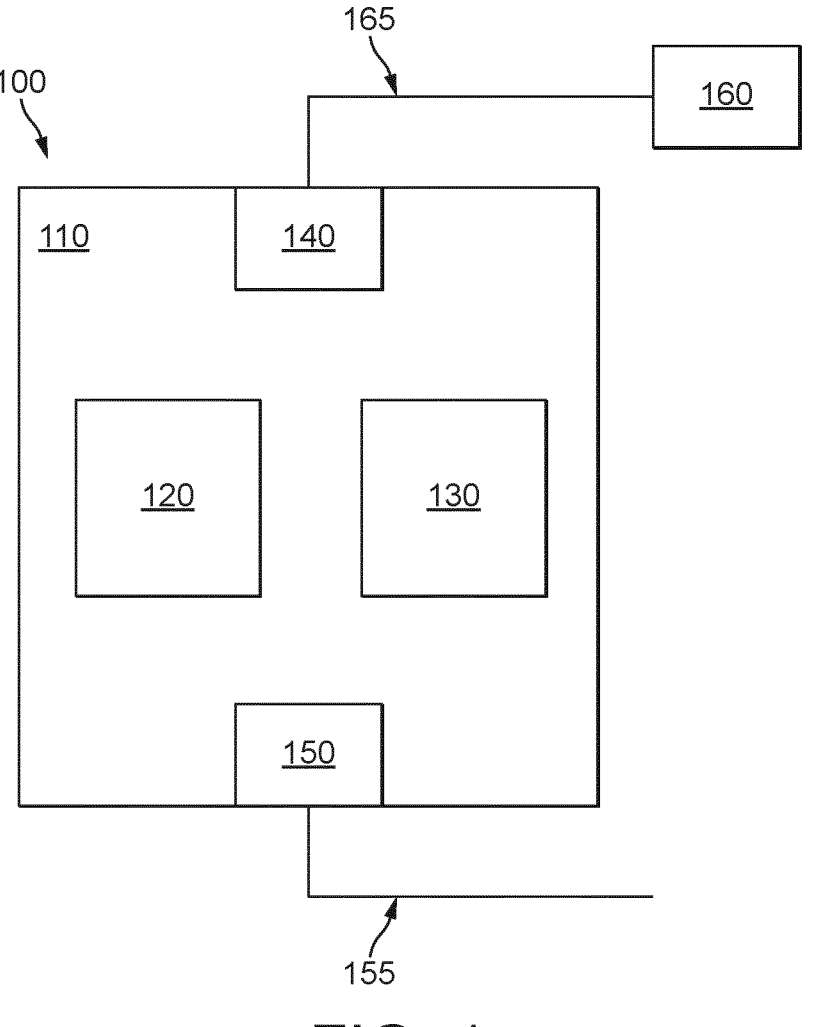
FIG. 1 shows an example control system for a vehicle according to examples disclosed herein.

With reference to FIG. 1, there is illustrated a control system 100 for a vehicle. The control system 100 as illustrated in FIG. 1 comprises one controller 110, although it will be appreciated that this is merely illustrative. The controller 110 comprises processing means 120 and memory means 1130. The processing means 120 may be one or more electronic processing device 120 which operably executes computer-readable instructions. The memory means 130 may be one or more memory device 130. The memory means 130 is electrically coupled to the processing means 120. The memory means 130 is configured to store instructions, and the processing means 120 is configured to access the memory means 130 and execute the instructions stored thereon.

The controller 110 comprises an input means 140 and an output means 150. The input means 140 may comprise an electrical input 140 of the controller 110. The output means 150 may comprise an electrical output 150 of the control system 100. The input 140 is configured to receive one or more input signals 165, for example from a sensor 160.

There may be one or more sensors which provide information to the controller input 140. The output 150 is configured to provide one or more output signals 155.

In an example, the control system 100 is for a vehicle suspension system of a vehicle. The vehicle suspension system comprises a roll control system configured to control torque applied to an actuator. The control system is configured to receive a torque request signal 165 via the input means 140. The torque request signal 165 is a signal indicative of a requested torque value to be applied to the actuator of the roll control system of the vehicle suspension system of the vehicle. The control system 100 is configured to determine whether the requested torque value is within a predetermined range of torque demand values. The predetermined range covers a zero torque demand value. If the requested torque value is within the predetermined range of torque demand values, the control system 100 is configured to output, via the output means 150, a signal 155 to control the roll control system in dependence on a control function. The control function is configured to apply and maintain a positive predetermined level of torque to the actuator when the requested torque value is positive. The control function is configured to apply and maintain a negative predetermined level of torque to the actuator when the requested torque value is negative.

Figure 2A:
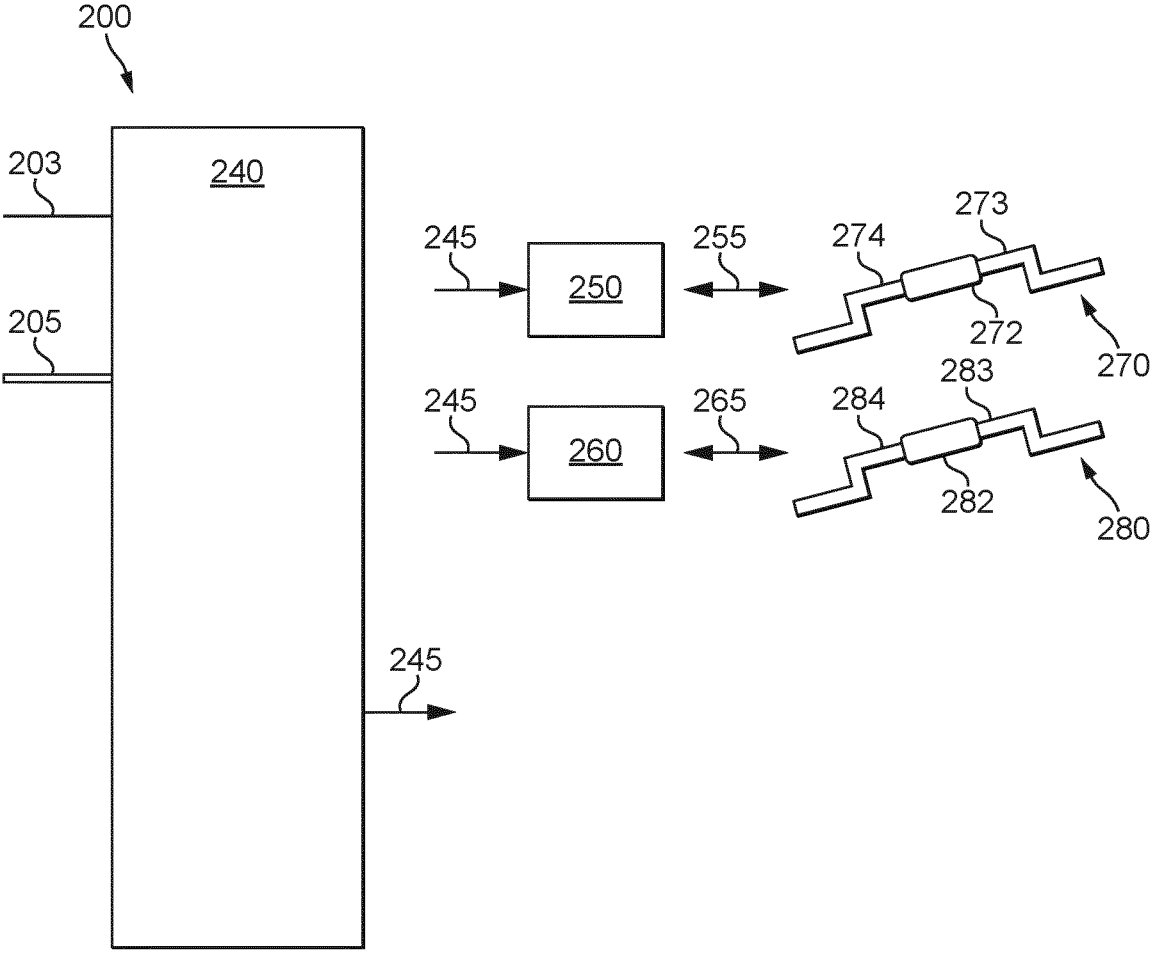
FIG. 2a shows an example control system for a vehicle connected to front and rear anti-roll bars according to examples disclosed herein.
Figure 2B:
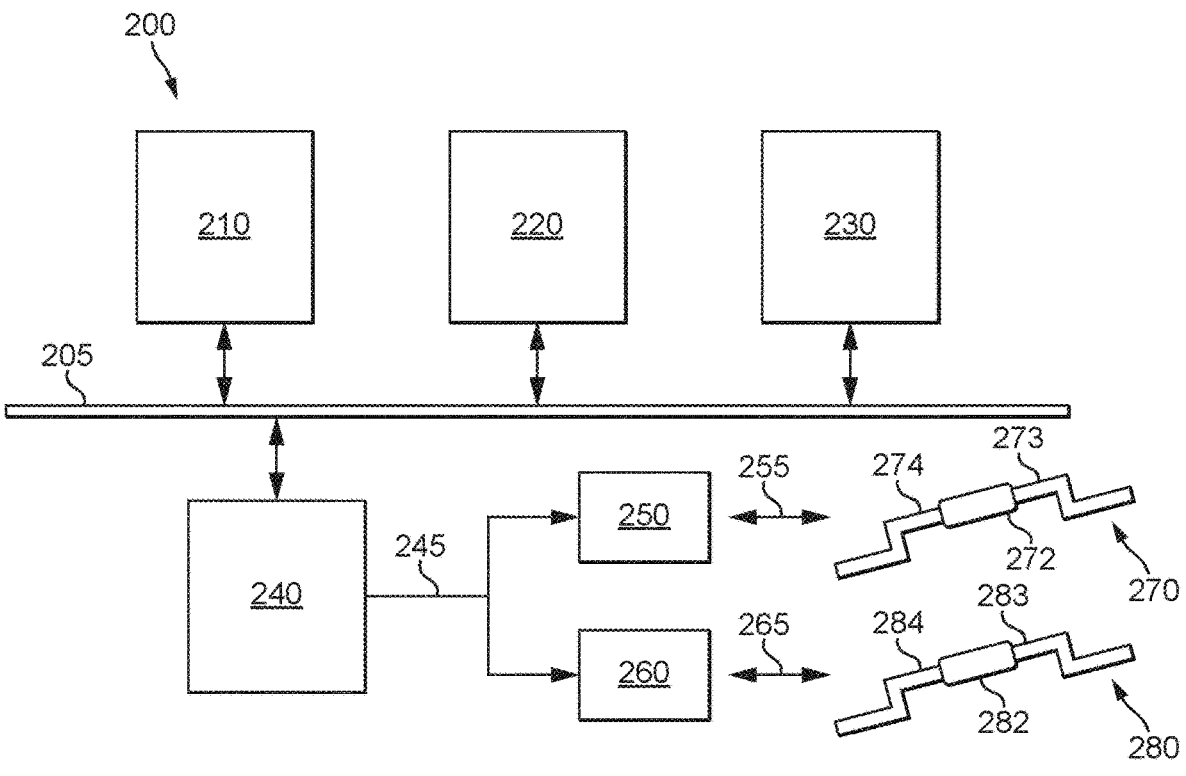
FIG. 2b shows an example control system for a vehicle comprising plural sub-systems, and front and rear anti-roll bars, according to examples disclosed herein.

FIGS. 2a and 2b illustrate example control systems 200 for a suspension system of a vehicle. A suspension system of a vehicle may comprise anti-roll bars 270, 280 which are controlled using an anti-roll control system. The anti-roll control system acts to control the actuator assemblies 270, 280, to control a roll of a body of the vehicle and reduce the impact of disturbances from a road surface. The anti-roll control system may be electromechanical and/or hydraulic. Anti-roll bars 270, 280 may typically comprise stabiliser bars, typically metal, which join the vehicle suspension on either side of the vehicle axle, usually through drop links, and connect to a rotational actuator situated between the mounting points to the vehicle chassis. Each side of the anti-roll bar is able to rotate freely when a motor of the anti-roll control system is not energised. When the motor control is enabled (i.e. delivering torque), the anti-roll bar may act as a torsional spring. The anti-roll bars may be controlled to compensate for some vehicle movements such as body roll, for example from driving around a corner. Body roll can cause the wheels at the side of the vehicle outside the turn to reduce their contact with the road surface. Anti-roll bars may be controlled to counteract this effect and reduce the body roll effect, by transferring at least part of the additional load on the wheels at the side of the vehicle inside the turn to those wheels at the outside, for example by providing a torsional effect to pull the wheels towards the chassis and even out the imbalance in load on the wheels caused by cornering.

A typical suspension system may comprise passive front and rear anti-roll bars provided respectively between the front and rear pairs of wheels of a standard four-wheel vehicle. In a vehicle with an active roll control system, an anti-roll bar 270, 280 may respectively comprise two anti-roll bar ends 273, 274; 283, 284 connected together by a central housing having an actuator 272, 282. The central housing may additionally have one or more of a gearbox, sensors, and dedicated actuator controllers. The actuator 272, 282 acts to provide an actively controlled torque rather than a fixed torsional stiffness provided by passive anti-roll bars. One or more sensors may monitor the movement of the vehicle, and provide the sensed parameters as input to the active roll control system to control the actuator and provide a suitable torque to the anti-roll bar. The two ends of the anti-roll bar 273, 274; 283, 284 may be identical, or may be non-identical.

FIG. 2a shows an example control system 200 for a suspension system a vehicle, communicatively connected to front and rear anti-roll bars 270, 280. The control system 200 comprises a controller 240 which is connected by a bidirectional communication channel 245 to anti-roll bar controllers 250, 260 configured to respectively control front and rear anti-roll actuators 272, 282. The controller 240 may be the controller 110 of FIG. 1. The controller 240 may comprise one or more of the controllers 110 of FIG. 1. In an example, the controller 240 may be a master controller for an electronic active roll control system in the vehicle. The controller 240 may host a vehicle level control strategy and actuation control for the electronic active roll control system in the vehicle.

The controller 240 may be configured to receive one or more sensor signal 203 from one or more sensors attached to the vehicle. The one or more sensors signals 203 may comprise, for example, a signal from a respective suspension height sensor of the vehicle suspension; a signal from a respective motor position sensor for the anti-roll bar actuators 272, 282; a signal from a respective hub acceleration sensor of the vehicle; and a signal from a respective torque sensor for the anti-roll bar actuators 272, 282. A signal from a respective motor position sensor for the anti-roll bar actuators 272, 282 may be communicated to the controller 240 via the communication link 245. A suspension height sensor may be configured to determine a sensor signal indicative of one or more of a height of a left wheel and a height of a right wheel of the vehicle. A motor position sensor may be configured to determine a sensor signal indicative of a position of a respective motor of the anti-roll bar actuators 272, 282. A hub acceleration sensor may be configured to determine a sensor signal indicative of an acceleration of one or more hub of a wheel of the vehicle. A torque sensor may provide a measure of an existing torque generated in the system, as a result of a target torque demand being requested by the controller.

The controller 240 may be configured to receive one or more communication signals via a communications bus 205. The communications bus 205 may be configured to deliver data to the controller 240 from other subsystems within the vehicle. For example, the communications bus 205 may be configured to communicate a signal indicating a status of one or more modules 210, 220, 230 that are in communicative connection with the controller 240 to the controller 240. In another example, the communications bus 205 may be configured to communicate a command from the controller 240 to the one or more modules 210, 220, 230 that are in communicative connection with the controller 240. The one or more modules 210, 220, 230, are discussed further in relation to FIG. 2b below. Signals transmitted over connections 203 or 245 may alternatively or additionally be transmitted over communications bus 205.

The controller 240 may be configured to generate system demand signals to influence a vehicle's motion via the anti-roll actuators 272, 282. An actuator provided between a front pair of wheels of a vehicle may be called a front actuator. A front active roll control (FARC) module may be electrically connected to the front actuator, and may comprise the controller 250 to control the front actuator 272. Similarly, an actuator provided between a rear pair of wheels of a vehicle may be called a rear actuator. A rear active roll control (RARC) module may be electrically connected to the rear actuator and may comprise a controller 260 to control the rear actuator 282.

The front and rear anti-roll actuators 272, 282 each comprise an electric motor which is controllable by the respective anti-roll controller 250, 260. Each of the front and rear anti-roll actuators 270, 280 may be controlled by its own respective anti-roll controller in some examples, or multiple anti-roll actuators may be controlled by a common anti-roll controller in some examples. Each of the anti-roll actuators 272, 282 may be individually controlled in some cases to improve the management of the roll of the body of the vehicle. The front and rear anti-roll actuators 272, 282 may be controlled by a control signal which is generated by the controller 240 may generate and output, through the output channel 255, 265, to the anti-roll bar controllers 250, 260, which then use the communication channel 245 to exchange data with the controller 240. The control signal may carry instructions to be implemented by the actuator, for example by providing a torque to apply to the anti-roll bar. For example, as discussed above, when the vehicle is cornering, a control signal may be transmitted to the anti-roll bar controllers 250, 260, which may in turn transmit a control signal via interface 255, 265, so that the front and read anti-roll actuators 272, 282 may mitigate a body roll effect. Similarly, anti-roll bar controllers 250, 260 may transmit measured values from the anti-roll actuators 272, 282 to the controller 240 through output channel 245.

FIG. 2b shows an example control system 200 for a vehicle comprising one or more modules 210, 220, 230, a controller 240 and front and rear anti-roll bars 270, 280. As in FIG. 2a, the control system 200 comprises a controller 240 which is connected by a communication channel 245 to controllers 250, 260 configured to respectively control front and rear anti-roll bar actuators 272, 282. Further, the controller 240 of the control system 200 is in a communicative connection to the one or more modules 210, 220, 230 via a communications bus 205. The one or more modules 210, 220, 230 may be configured to perform functions relating to power supply of the suspension system. Module 210 may be a power control module configured to control a power supply system for the suspension system. Module 220 may be a conversion module configured to convert electrical energy output from a vehicle power supply system. In an example, the conversion module 220 may comprise a DC-DC converter. Module 230 may be a capacitor or supercapacitor module configured to store electrical energy for the suspension system. Together, conversion module 220 and capacitor module 230 may be configured to supply electrical energy to the controllers 250, 260, such that the anti-roll bar actuators 272, 282 can be actuated. FIG. 3 illustrates these modules 210, 220, 230 as individual modules. However, there may be examples whereby components within the modules 210, 220, and 230 are included in a single module.

Figure 3A:
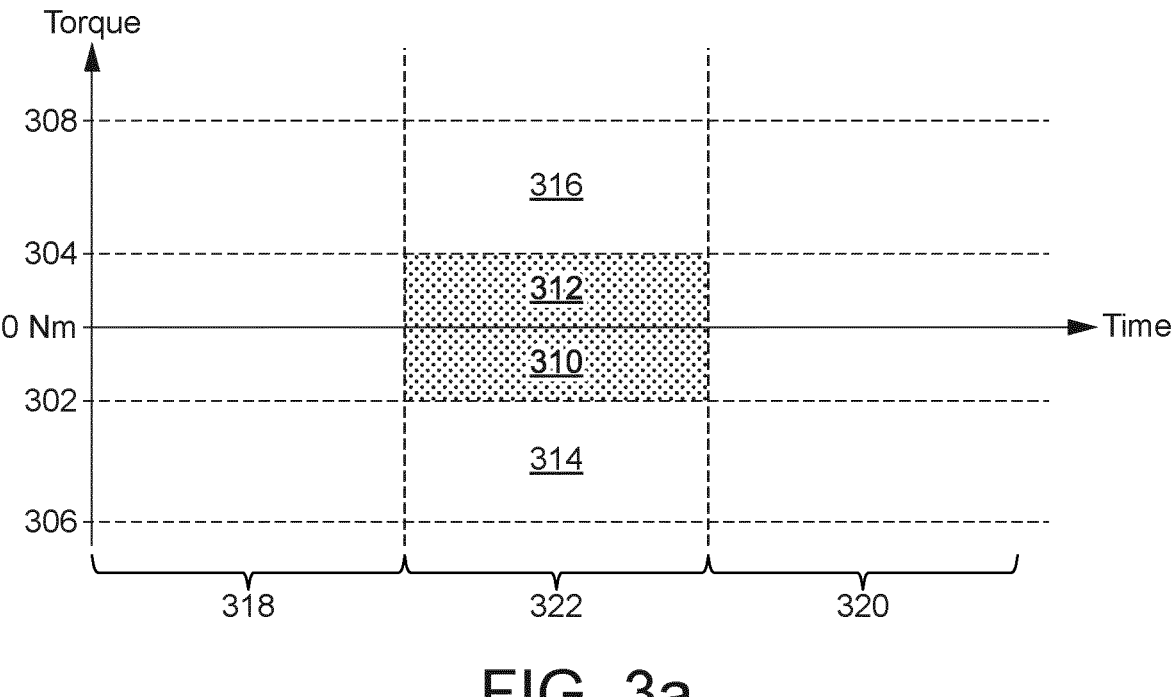
FIG. 3a shows an example of a predetermined range of torque values within which a control system may operate according to examples disclosed herein.

FIG. 3a illustrates an example of a predetermined range of torque values within which a control system may operate according to examples disclosed herein. In the zones 318 and 320, the control system is in a normal operation in which default behaviour for the damping system and the active roll control system is provided. In the zone 322, a Noise Harshness Vibration, NVH, management function is activated. Within zone 322, the control system delivers a modified operation in which the damping system provides, in addition to the normal operation of the damping system, a minimum level of damping and the active roll control system provides an adjusted torque demand signal=.

The torque limit 302 indicates a negative predetermined level of torque (for example −70 Nm) to be applied to the actuator when the requested torque value (for example, a vehicle level torque request value) is negative and within the limits of zero torque and the negative predetermined level of torque 302. The torque limit 304 indicates a positive predetermined level of torque (for example +70 Nm) to be applied to the actuator when the requested torque value is positive and within the limits of zero torque and the positive predetermined level of torque 304. The torque limit 306 indicates a maximum negative (i.e. a minimum) torque demand. The torque limit 308 indicates a maximum positive torque demand.

If the requested torque request value is in the zone 310, then the negative predetermined level of torque 302 is applied to the actuator. If the requested torque request value is in the zone 312, then the positive predetermined level of torque 304 is applied to the actuator. If the requested torque request value is in the zone 314, then the negative requested torque value is applied to the actuator. If the requested torque request value is in the zone 316, then the positive requested torque value is applied to the actuator.

Figure 3B:
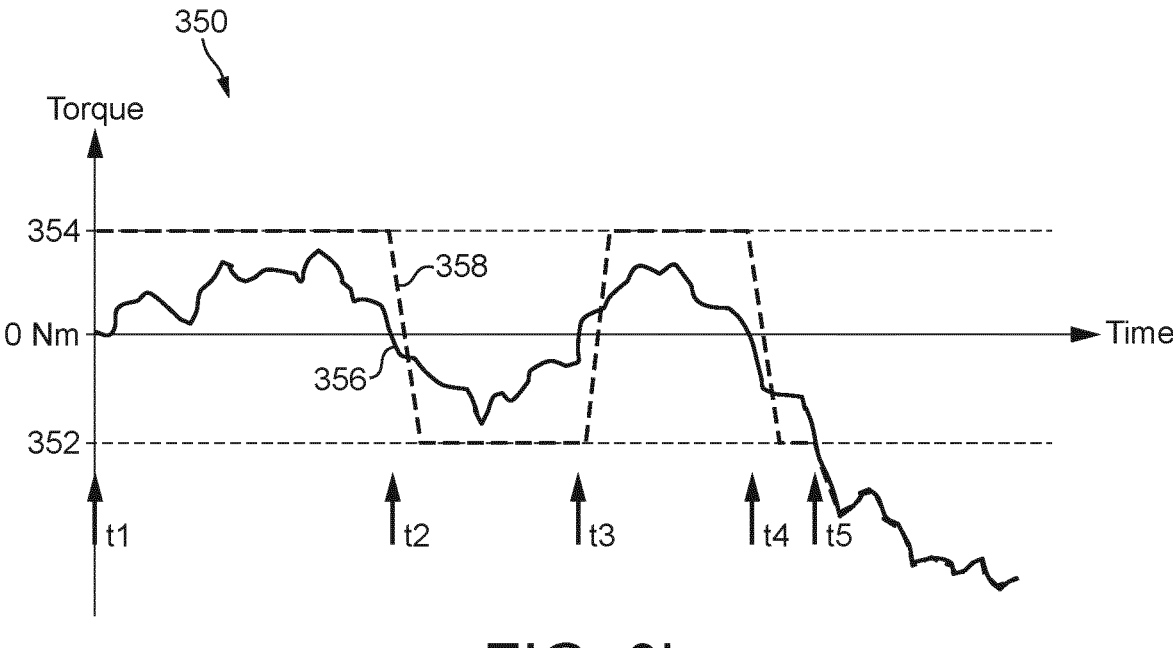
FIG. 3b shows an example of a requested torque value and an output torque request controlled according to a control function according to examples disclosed herein.

FIG. 3b shows an example of a torque request 356 (for example, a vehicle level torque request) and an output torque demand controlled according to a control function. The graph illustrates an example torque request signal 356 indicative of a requested torque value to be applied to an actuator of a roll control system. A predetermined range of torque values within which a control system may operate in a first mode is shown between a lower torque limit 352 and an upper torque limit 354. Outside this range the control system may operate in a second mode. Between times $t_1$ and $t_2$ the torque request signal is within the predetermined range of torque values and is positive. The control function applies and maintains a positive predetermined level of torque 354 to the actuator in response. Between times $t_2$ and $t_3$ the torque request signal is within the predetermined range of torque values and is negative. The control function applies and maintains a negative predetermined level of torque 352 to the actuator in response. Additionally, when the sign of the torque request signal changes and the predetermined level of torque moves from positive 354 to negative 352, the torque applied is ramped 358 to provide a smooth transition.

Between times $t_3$ and $t_4$ the torque request signal is within the predetermined range of torque values and is positive again. The control function again applies and maintains a positive predetermined level of torque 354 to the actuator in response. Between times $t_4$ and $t_5$ the torque request signal is within the predetermined range of torque values and is negative. The control function again applies and maintains a negative predetermined level of torque 352 to the actuator in response. After time to the torque request signal is outside the predetermined range of torque values and is negative. The control function is configured here to provide an unadjusted torque demand signal indicative of the requested torque value to the actuator because the torque request is outside the predetermined range.

FIG. 3b also shows that, when the torque request signal changes from a positive to a negative value, the change takes place over a period of time rather than an instantaneous switch. In other words, when it is determined that the requested torque value changes between positive and negative torque values, a torque request adjustment is applied to the torque request signal to obtain an adjusted torque demand signal to be provided to the actuator. The torque request adjustment applies a ramp rate to the torque request signal to control the rate of change of torque applied to the actuator.

Figures 4, 5:
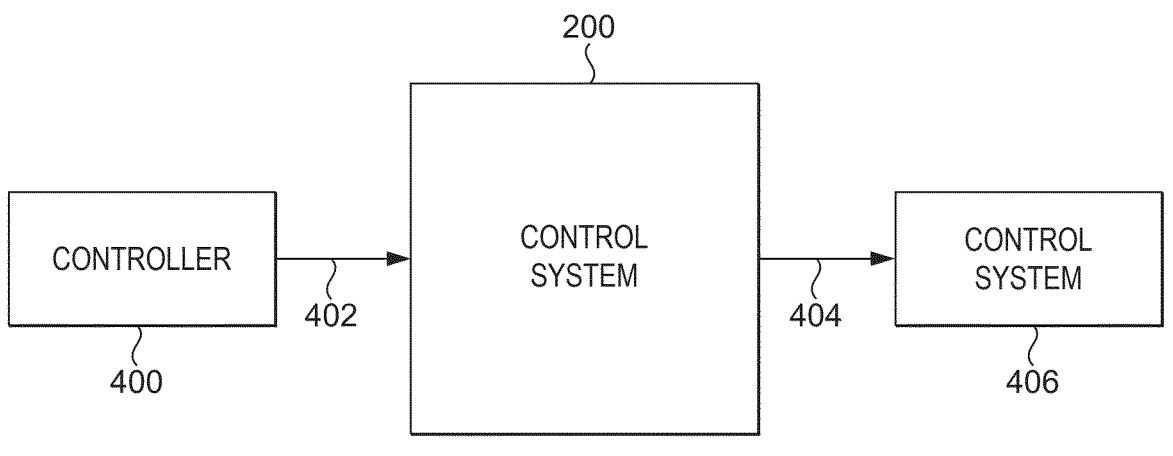
FIG. 4 shows an example module for a control system of a vehicle according to examples disclosed herein.
FIG. 5 shows an example method for the control system of a vehicle according to examples disclosed herein.

FIG. 4 shows an example control system 200 for a vehicle. The control system 200 is configured to receive a torque request 402 indicative of a requested torque value to be applied an actuator of a roll control system of the vehicle. The torque request may be received from a controller 400 of the vehicle. The torque request may be a vehicle level torque request.

The control system 200 is configured to determine whether the requested torque value is within a predetermined range of torque values. The predetermined range of torque values covers a zero torque demand value. Minimum and maximum values of the predetermined range may be calibratable. The predetermined range may be determined in dependence on one or more of a speed of the vehicle and a road roughness index corresponding to a driving surface on which the vehicle is located. The predetermined range may be determined according to functions or gain functions of one or more of the vehicle speed and road roughness index. The predetermined range may be set such that a majority of zero torque crossings happen within the range; as such, a majority of rattle events can be prevented.

If the requested torque is within the predetermined range of torque demand values, the control system 200 is configured to output a signal 404 to control the roll control system 406 (for example, an electronic active roll control system) in dependence on a control function. The control function is configured to apply and maintain a positive predetermined level of torque to the actuator when the requested torque value is positive. The control function is configured to apply and maintain a negative predetermined level of torque to the actuator when the requested torque value is negative.

For example, the control system 200 may receive a torque request that is within the predetermined range of values. In this case, a signal would be output by the control system 200 to control the roll control system 406 to apply a predetermined level of torque to the actuators depending on whether the requested torque is positive or negative. For example, if the requested torque value was 50 Nm and within the predetermined range of values, a positive predetermined level of torque would be applied (for example, a torque value of 70 Nm might be applied). In another example, if the request torque value was −50 nm and within the predetermined range of values, a negative predetermined level would be applied (for example, a torque value of −70 Nm might be applied).

The control function may be configured to be activated in dependence on one or more of a speed of the vehicle and a road roughness index corresponding to a driving surface on which the vehicle is located. The predetermined level of torque applied to the actuator may be a constant value. For example, the predetermined level of torque applied to the actuator may be 70 nm if the requested torque value is positive or may be −70 nm if the requested torque value is negative.

For example, the control function may be a Noise Vibration Harshness, NVH, torque control function which is configured to manage torque levels within the predetermined range of torque values, around a 0 Nm torque value. The control function may be configured to reduce the occurrence of zero torque value crossings (i.e., to reduce the number of times an applied torque value will change signs).

FIG. 5 shows an example method for a control system 200 of the vehicle as exemplified in FIG. 4. The control function of the control system 200 is configured to determine that the requested torque value changes between positive and negative values 502. For example, the requested torque value may move from a positive value to a negative value, or from a negative value to a positive value.

The control function which is output is configured to apply a torque request adjustment 504 to the torque request signal to obtain an adjusted torque demand signal to be provided to the actuator. The torque request adjustment comprises application of a ramp rate to the torque request signal to control the rate of change of torque applied to the actuator. The rate of change of torque may be calibratable. By applying a ramp rate to the torque request, a smooth transition between positive and negative torque can be provided. The control function may be rate limited, such that the rate of change of torque is limited while the control function is activated.

That is, when it is determined that the requested torque value will cause a change in sign of applied torque, a torque request adjustment may be applied to ramp the rate at which the torque is changed in order to provide a smoother transition between positive and negative torque.

The torque request adjustment may be applied to the torque request signal prior to providing the adjusted torque demand to the actuator if the requested torque value is in the predetermined range. That is, when it is determined that the torque request will cause the applied torque to change sign, a rate of change of the torque may be controlled before the torque is provided.

The control function may be configured to provide an unadjusted torque demand signal 506 to the actuator if the requested torque value is outside the predetermined range. The unadjusted torque demand signal is indicative of the requested torque value. The unadjusted torque demand signal is configured to cause the actuator to apply the requested torque value. That is, if the requested torque value is outside the predetermined range, the requested torque value is applied immediately, and is not adjusted. The control system 200 is configured to provide the adjusted torque demand signal to the actuator.

Figure 6:
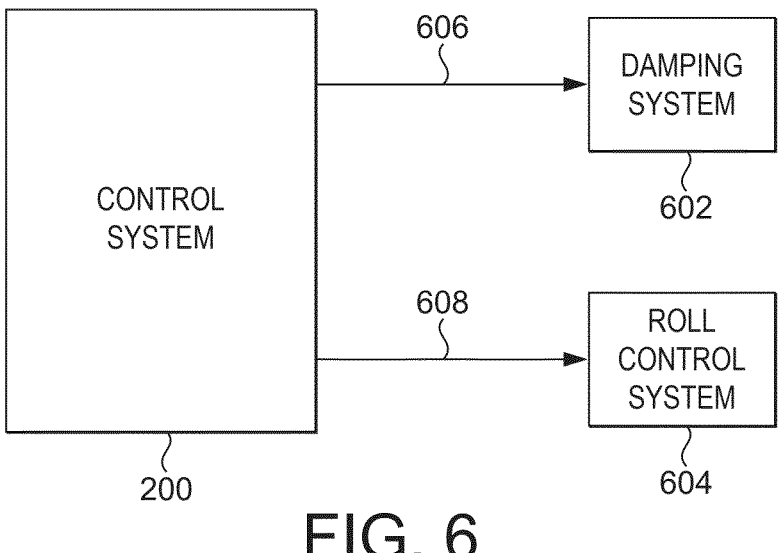
FIG. 6 shows an example module for the control system of a vehicle according to examples disclosed herein.

FIG. 6 shows an example control system 200. The control function of the control system 200 may be configured to provide a damping control signal 606 to a damping system 602 (for example, an adaptive damping system) of the vehicle. The damping control signal 606 is configured to cause the damping system to apply a predetermined level of damping to a damping actuator of the vehicle. The predetermined level of damping may be calibratable. For example, the predetermined level of damping may represent a minimum damping level that is applied and maintained as long as the control function is active.

The control function of the control system 200 may be configured to, when a level of damping higher than the predetermined level of damping is applied, apply and maintain the higher level of damping to the damping actuator for a period of time longer than the level of damping would be maintained if the control function were not activated. The predetermined period of time may be calibratable. For example, a damping level which is higher than the predetermined level of damping may be provided for a longer period of time, by providing a damping level decay rate.

The control function of the control system 200 may be configured to output 608 a signal to control the roll control system 604 to apply and maintain a predetermined level of torque in dependence on whether a requested torque value is positive or negative; wherein if the requested torque value is positive, a positive predetermined level of torque is provided and if the requested torque value is negative, a negative predetermined level of torque is provided.

The control function of the control system 200 may be configured to monitor the requested torque to determine whether the requested torque remains within the predetermined range of torque demand values. For example, the control function may be an active function that is continuously tracking the applied torque.

Figure 7:
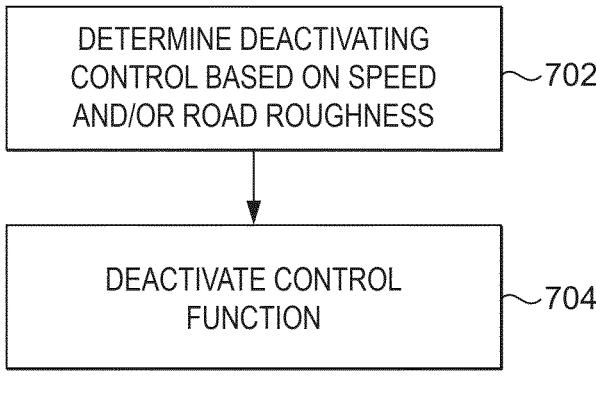
FIG. 7 shows an example method for the control system of a vehicle according to examples disclosed herein.

FIG. 7 shows an example of a method for a control system 200. The control system 200 may be configured to determine 702 to deactivate the control function based on one or more of the speed of the vehicle and the road roughness index. That is, the control function may be deactivated if the speed of the vehicle or the road roughness index indicate that it is no longer needed. For example, if the vehicle is driving faster than a predetermined speed or slower than another predetermined speed, the control function may be deactivated. Similarly, the control function may be deactivated if the road is rougher than a predetermined value or smoother than another predetermined value.

The control system 200 may be configured to deactivate 704 the control function, in dependence on the determination to deactivate the control function, by providing a first actuation control signal to the actuator. The first actuation control signal is configured to adjust a current torque demand corresponding to a current torque demand signal in agreement with the torque request signal within a predetermined time period. That is, when the control function is deactivated, a torque level corresponding to a vehicle torque demand is applied to the actuator. The torque is applied over a predetermined time period, ramping the rate at which the torque is applied to the actuator in order to provide a smooth transition as the control function is deactivated.

The predetermined time period may be dependent on whether, when it is determined to deactivate the control function, the requested torque value is within the predetermined range of torque demand values. By adjusting the current torque demand within a predetermined time period, a smooth transition when deactivating the control function can be provided.

For example, if the requested torque value is within the predetermined range of torque demand values when it is determined to deactivate the control function, the predetermined time period may be longer than if the requested torque value is outside the predetermined range of torque demand values when it is determined to deactivate the control function. That is, if the vehicle level torque request is within the predetermined range of torque demand values when the control function is deactivated, a slower blend to the vehicle level torque request value is provided than if the vehicle level torque request is outside the predetermined range of torque demand values.

For example, if the requested torque value is within the predetermined range of torque demand values when it is determined to deactivate the control function, the current torque demand may be adjusted according to a Noise Vibration Harshness, NVH, biased calibration.

For example, if the requested torque value is outside the predetermined range of torque demand values when it is determined to deactivate the control function, the current torque demand may be adjusted according to a dynamics biased calibration.

Figure 8A:
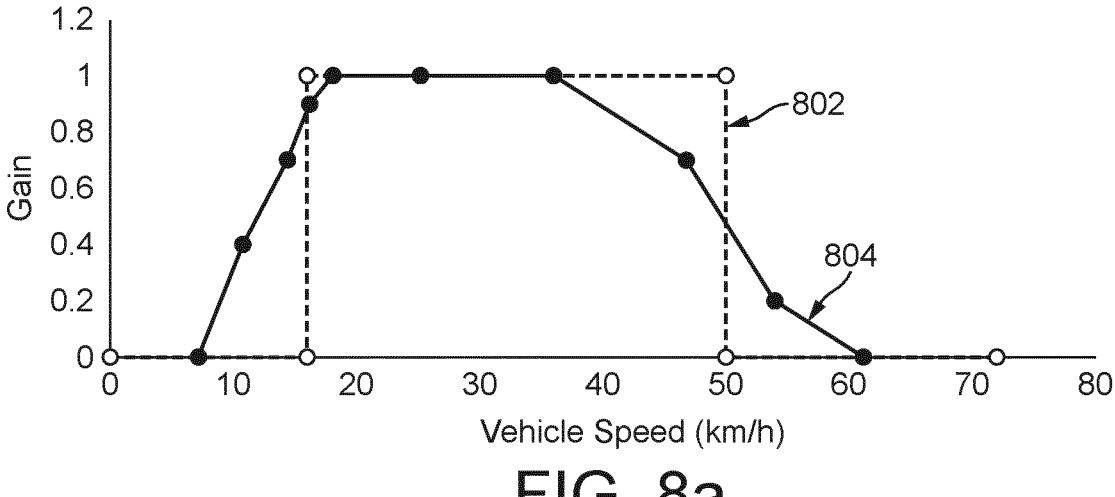
FIGS. 8a-b show example ranges of vehicle speed and road roughness index in which the control function is active according to examples disclosed herein.
Figure 8B:
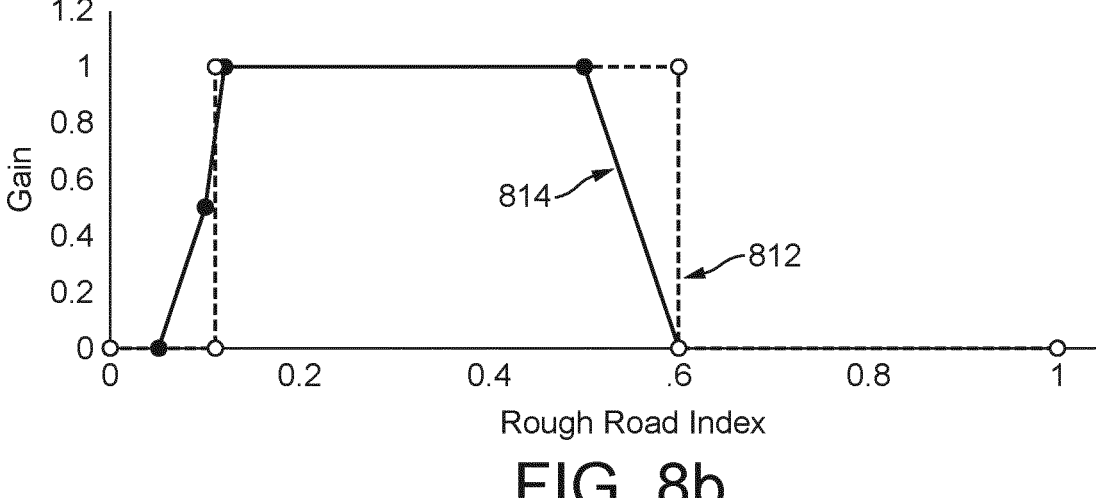

FIGS. 8a and 8b show examples of graphs of roll control function 802, 812 and damping level factor 804, 814 as a function of vehicle speed (FIG. 8a) and road roughness index (FIG. 8b) when the control function is activated. Both graphs show that the roll control system, which may modify the requested torque value by applying a torque request adjustment and a ramp rate, may be a binary function, activated as an on/off switch. That is, when one or more of the vehicle speed and the road roughness index are within predefined parameters, the control function (which may, for example, be an NVH management function) is activated.

Additionally, the graphs show that the damping system, when the control function is activated, may apply an offset to the existing damping level via a gain function of one or more of the vehicle speed and the road roughness index. That is, a level of damping applied by the damping system may be increased to a predetermined damping level as a gain function of one or more of the vehicle speed and the road roughness index.

A combination of the damping system and the roll control system may result in a reduction in peak acceleration of the actuator, reducing noise in the cabin of the vehicle.

Figure 9:
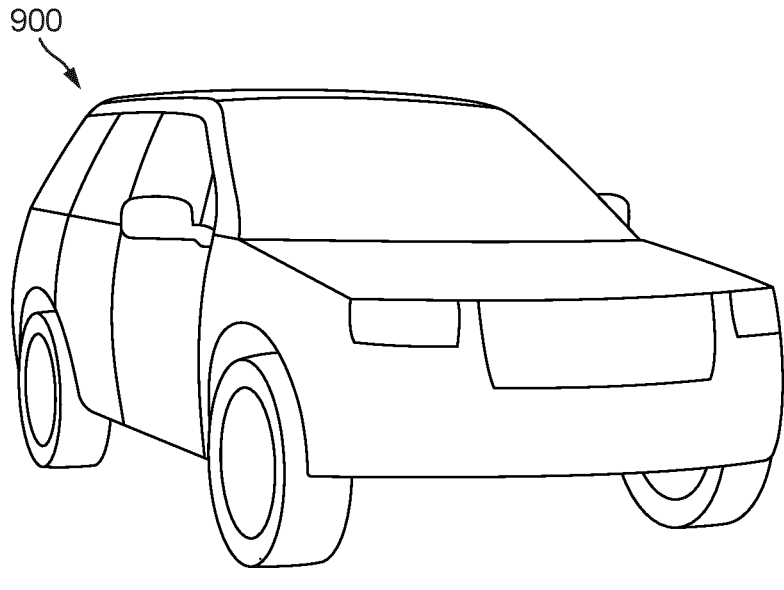
FIG. 9 shows a vehicle in accordance with examples disclosed herein.

FIG. 9 shows an example vehicle 900 that may comprise the control system for a vehicle suspension system in a vehicle according to any of the examples disclosed herein. The vehicle 900 in the present embodiment is an automobile, such as a wheeled vehicle, but it will be understood that the control system and active suspension system may be used in other types of vehicle.

As used here, 'connected' means 'mechanically connected' and/or 'electrically interconnected' either directly or indirectly. Electrical interconnection does not have to be galvanic. Where the control system is concerned, connected means operably coupled to the extent that messages are transmitted and received via the appropriate communication means.

It will be appreciated that various changes and modifications can be made to the present invention without departing from the scope of the present application. Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a vehicle suspension system in a vehicle, the control system comprising one or more controllers, the control system configured to:

receive a torque request signal indicative of a requested torque value to be applied to an actuator of a roll control system;

determine whether the requested torque value is within a predetermined range of torque demand values, wherein the predetermined range covers a zero torque demand value; and if the requested torque is within the predetermined range of torque demand values, output a signal to control the roll control system in dependence on a control function;

wherein the control function is configured to:

apply and maintain a positive predetermined level of torque to the actuator when the requested torque value is positive; and apply and maintain a negative predetermined level of torque to the actuator when the requested torque value is negative.

2. The control system of claim 1, wherein the control function is configured to:

determine that the requested torque value changes between positive and negative torque values;

apply a torque request adjustment to the torque request signal to obtain an adjusted torque demand signal to be provided to the actuator, wherein the torque request adjustment comprises application of a ramp rate to the torque request signal to control the rate of change of torque applied to the actuator; and provide the adjusted torque demand signal to the actuator.

3. The control system of claim 2, wherein the control function is configured to:

apply the torque request adjustment to the torque request signal prior to providing the adjusted torque demand signal to the actuator if the requested torque value is in the predetermined range.

4. The control system of claim 1, wherein the control function is configured to:

provide an unadjusted torque demand signal indicative of the requested torque value to the actuator if the requested torque value is outside the predetermined range, the unadjusted torque demand signal configured to cause the actuator to apply the requested torque value.

5. The control system of claim 1, wherein the control function is configured to:

provide a damping control signal to a damping system, the damping control signal configured to cause the damping system to apply a predetermined level of damping to a damping actuator of the vehicle.

6. The control system of claim 5, wherein, when a level of damping higher than the predetermined level of damping is applied, the control function is configured to apply and maintain the higher level of damping to the damping actuator for a period of time longer than the level of damping would be maintained if the control function were not activated.

7. The control system of claim 1, wherein the control function is configured to:

monitor the requested torque to determine whether the requested torque remains within the predetermined range of torque demand values.

8. The control system of claim 1, wherein the control function is configured to be activated in dependence on one or more of a speed of the vehicle and a road roughness index corresponding to a driving surface on which the vehicle is located.

9. The control system of claim 8, configured to:

determine to deactivate the control function based on the speed of the vehicle and the road roughness index, and deactivate the control function in dependence on the determination by providing a first actuation control signal to the actuator to adjust a current torque demand corresponding to a current torque demand signal in agreement with the torque request signal within a predetermined time period.

10. The control system of claim 9, wherein the predetermined time period is dependent on whether, when it is determined to deactivate the control function, the requested torque value is within the predetermined range of torque demand values.

11. The control system of claim 1, wherein the rate of change of the torque is calibratable.

12. A system, comprising:

the control system for a vehicle suspension system according to claim 1;

an actuator of a roll control system; and an adaptive damping system.

13. A vehicle comprising a control system according to claim 1.

14. The control system of claim 1, wherein the predetermined range of torque demand values comprises a torque limit indicating a negative predetermined level of torque and a torque limit indicating a positive predetermined level of torque.

15. The method of claim 1, wherein the predetermined range of torque demand values comprises a torque limit indicating a negative predetermined level of torque and a torque limit indicating a positive predetermined level of torque.

16. A method, comprising:

receiving a torque request signal indicative of a requested torque value to be applied to actuator of a roll control system; and determining whether the requested torque is within a predetermined range of torque demand values, wherein the predetermined range covers a zero torque demand; and when the requested torque is within the predetermined range of torque demand values, outputting a signal to control one or more systems of the vehicle suspension system to manage suspension of the vehicle in dependence on a control function; wherein the control function is configured to:

apply and maintain a positive predetermined level of torque to the actuator when the requested torque value is a positive value; and apply and maintain a negative predetermined level of torque to the actuator when the requested torque value is a negative value.

17. Computer readable instructions arranged to perform a method according to claim 16.

* * * * *